US006253299B1

United States Patent
Smith et al.

(10) Patent No.: US 6,253,299 B1
(45) Date of Patent: Jun. 26, 2001

(54) VIRTUAL CACHE REGISTERS WITH SELECTABLE WIDTH FOR ACCOMMODATING DIFFERENT PRECISION DATA FORMATS

(75) Inventors: Jack R. Smith; Sebastian T. Ventrone, both of South Burlington; Keith R. Williams, Essex Junction, all of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/224,793

(22) Filed: Jan. 4, 1999

(51) Int. Cl.[7] ........................................... G06F 12/00
(52) U.S. Cl. ........................ 711/171; 711/117; 711/118; 711/119; 711/123; 708/513; 708/518; 712/22; 712/222
(58) Field of Search ................................... 708/204, 205, 708/495, 496, 513, 518; 712/210, 220, 222; 711/100, 117, 118, 119, 123, 130, 132

(56) References Cited

U.S. PATENT DOCUMENTS

| 4,823,260 | * | 4/1989 | Imel et al. ........................ 712/222 |
| 5,226,141 | * | 7/1993 | Esbensen ......................... 711/171 |
| 5,448,705 | * | 9/1995 | Nguyen et al. ................... 712/244 |
| 5,475,856 | | 12/1995 | Kogge . |
| 5,511,211 | | 4/1996 | Akao et al. . |
| 5,581,773 | | 12/1996 | Glover . |
| 5,586,303 | * | 12/1996 | Willenz et al. ................... 711/172 |
| 5,588,152 | | 12/1996 | Dapp et al. . |
| 5,590,345 | | 12/1996 | Barker et al. . |
| 5,590,356 | | 12/1996 | Gilbert . |
| 5,625,836 | | 4/1997 | Barker et al. . |
| 5,659,780 | | 8/1997 | Wu . |
| 5,752,271 | * | 5/1998 | Yung .................................. 711/171 |
| 5,778,424 | * | 7/1998 | Guy .................................. 711/118 |
| 5,805,486 | * | 9/1998 | Sharangpani ..................... 708/524 |
| 5,864,703 | * | 1/1999 | van Hood et al. ................ 712/22 |
| 5,887,183 | * | 3/1999 | Agarwal et al. .................. 712/2 |
| 5,901,316 | * | 5/1999 | Goebel ............................... 717/5 |

FOREIGN PATENT DOCUMENTS 0 748 079 A2    12/1996   (EP) .

* cited by examiner

Primary Examiner—Meng-Al T. An
Assistant Examiner—Wen-Tai Lin
(74) Attorney, Agent, or Firm—McGinn & Gibb, PLLC; Eugene I. Shkurko, Esq.

(57) ABSTRACT

A structure and method for processing data comprises a processing unit having a base cache, base registers having a base width and being operatively connected to the processing unit, and virtual cache registers having a virtual width and being located in the base cache and operatively connected to the processing unit, wherein a base processing precision of the processing system is determined by the base width of the base registers and a selectable enhanced processing precision is determined by the virtual width of the virtual cache registers, wherein the base registers store base instructions and data and the virtual cache registers store enhanced data, the virtual width being greater than the base width, and wherein the base cache includes tags identifying a portion of the base cache as the virtual registers, the virtual cache registers being accessible by the processing unit only for execution of enhanced instructions for providing the enhanced processing precision.

23 Claims, 5 Drawing Sheets

| SIMD PARALLELISM | | CONTENTS |
|---|---|---|
| 1-WAY | 32 BYTE | INTEGER |
| 2-WAY | 16 BYTE \| 16 BYTE | INTEGER |
| 4-WAY | 8 BYTE \| 8 BYTE \| 8 BYTE \| 8 BYTE | INTEGER |
| 8-WAY | 4 BYTE \| 4 BYTE \| 4 BYTE \| 4 BYTE \| 4 BYTE \| 4 BYTE \| 4 BYTE \| 4 BYTE | INTEGER |
| 1-WAY | 32 BYTE | FLOATING POINT |
| 2-WAY | 16 BYTE (2-BYTE SIGN/EXPONENT, 14-BYTE MANTISSA) \| 16 BYTE (2-BYTE SIGN/EXPONENT, 14-BYTE MANTISSA) | FLOATING POINT |
| 2-WAY | 10 BYTE (2-BYTE SIGN/EXPONENT, 8-BYTE MANTISSA) \| 16 BYTE (2-BYTE SIGN/EXPONENT, 8-BYTE MANTISSA) | FLOATING POINT |
| 4-WAY | 8 BYTE \| 8 BYTE \| 8 BYTE \| 8 BYTE | FLOATING POINT |
| 8-WAY | 4 BYTE \| 4 BYTE \| 4 BYTE \| 4 BYTE \| 4 BYTE \| 4 BYTE \| 4 BYTE \| 4 BYTE | FLOATING POINT |

256 BITS = 32 BYTES

FIG.3

| INSTRUCTION TYPE | MNEUMONIC | OPERATION |
|---|---|---|
| CONVERSION | MOVX | MOVE 4 ARCHITECTED GPRs TO HALF LINE OF MEMORY ELEMENT |
| | | MOVE HALF LINE OF MEMORY ELEMENT TO 4 ARCHITECTED GPRs |
| | | MOVE 2 FPRs TO MEMORY ELEMENT IN APPROPRIATE FORMAT |
| | | MOVE MEMORY ELEMENT TO 2 ARCHITECTED FPRs |
| | | COPY LINE OF MEMORY ELEMENT |
| | | EXPAND MEMORY ELEMENT FLOATING POINT FORMAT INTO LARGER # OF BYTES |
| | | PACK MEMORY ELEMENT FLOATING POINT FORMAT INTO SMALLER # OF BYTES |
| ARITHMETIC INTEGER | ADDX | ADD 32 BYTES |
| | ADDX2 | ADD DUAL 16-BYTE |
| | ADDX4 | ADD QUAD 8-BYTE |
| | ADDX8 | ADD OCT 4-BYTE |
| | SUBX | SUBTRACT 32 BYTE |
| | SUBX2 | SUBTRACT DUAL 16-BYTE |
| | SUBX4 | SUBTRACT QUAD 8-BYTE |
| | SUBX8 | SUBTRACT OCT 4-BYTE |
| FLOATING POINT | MULX | MULTIPLY 32 BYTES |
| | MULX2_16 | MULTIPLY DUAL 16-BYTE |
| | MULX2_10 | MULTIPLY DUAL 10-BYTE |
| | MULX4 | MULTIPLY QUAD 8-BYTE |
| | MULX8 | MULTIPLY OCT 4-BYTE |
| | DIVX | DIVIDE 32 BYTES |
| | DIVX2_16 | DIVIDE DUAL 16-BYTE |
| | DIVX2_10 | DIVIDE DUAL 10-BYTE |
| | DIVX4 | DIVIDE QUAD 8-BYTE |
| | DIVX8 | DIVIDE OCT 4-BYTE |
| SHIFT/COMPARE | SLLX | SHIFT LEFT LOGICAL 32-BYTE |
| | SLLX2 | SHIFT LEFT LOGICAL DUAL 16-BYTE |
| | SLLX4 | SHIFT LEFT LOGICAL QUAD 8-BYTE |
| | SLLX8 | SHIFT LEFT LOGICAL OCT 4-BYTE |
| | SRLX | SHIFT RIGHT LOGICAL 32-BYTE |
| | SRLX2 | SHIFT RIGHT LOGICAL DUAL 16-BYTE |
| | SRLX4 | SHIFT RIGHT LOGICAL QUAD 8-BYTE |
| | SRLX8 | SHIFT RIGHT LOGICAL OCT 4-BYTE |
| | SRAX | SHIFT RIGHT ARITHMETIC 32-BYTE |
| | SRAX2 | SHIFT RIGHT ARITHMETIC DUAL 16-BYTE |
| | SRAX4 | SHIFT RIGHT ARITHMETIC QUAD 8-BYTE |
| | SRAX8 | SHIFT RIGHT ARITHMETIC OCT 4-BYTE |
| | CMPEQX | COMPARE EQUAL 32-BYTE |
| | CMPEQX2 | COMPARE EQUAL DUAL 16-BYTE |
| | CMPEQX4 | COMPARE EQUAL QUAD 8-BYTE |
| | CMPEQX8 | COMPARE EQUAL OCT 4-BYTE |
| | CMPGTX | COMPARE GREATER THAN 32-BYTE |
| | CMPGTX2 | COMPARE GREATER THAN DUAL 16-BYTE |
| | CMPGTX4 | COMPARE GREATER THAN QUAD 8-BYTE |
| | CMPGTX8 | COMPARE GREATER THAN OCT 4-BYTE |

FIG.4

VIRTUAL CACHE REGISTERS WITH SELECTABLE WIDTH FOR ACCOMMODATING DIFFERENT PRECISION DATA FORMATS

BACKGROUND OF THE INVENTION

1. Field of the Invention

The present invention generally relates to data registers in central processing units and more particularly to using a memory element to expand the available set of data registers.

2. Description of the Related Art

Conventionally, a processor architecture defines the group of operations available to the user (e.g., the instruction set) and the method to access data for these operations (e.g., the register set). The architecture limits data accuracy and range because architected registers store operands and results in a specified number of bits.

An example of limited accuracy is that floating point units implement truncation or rounding to limit the mantissa to the number of bits specified by the architecture. Data range is limited by the architecture because the number of register bits is directly proportional (by a power of 2) to the number of unique values that it can represent.

Therefore, there is a conventional need for a method for the central processing unit (CPU) to operate on registers which are wider than the architected set but which maintain compatibility with the architecture to allow greater data precision and range. Furthermore, there is a conventional need for such a system to be scalable to cover emerging architectures such as Single Instruction Multiple-Data (SIMD).

SUMMARY OF THE INVENTION

It is, therefore, an object of the present invention to provide a structure and method for processing data, the structure comprising a processing unit having a base cache, base general registers having a base width and being operatively connected to the processing unit, and virtual cache registers having a virtual width and being located in the base cache and operatively connected to the processing unit, wherein a base processing precision of the processing system is determined by the base width of the base general registers and a selectable enhanced processing precision is determined by the virtual width of the virtual cache registers, wherein the base general registers store base instructions and data and the virtual cache registers store enhanced data, the virtual width being greater than the base width, and wherein the base cache includes tags identifying a portion of the base cache as the virtual registers, the virtual cache registers being accessible by the processing unit only for execution of enhanced instructions for providing the enhanced processing precision.

The base general registers have a first architecture and the virtual cache registers have a format associated with a second architecture. For example, the base general registers could have an X86 architecture and the virtual cache registers could have a data format associated with an SIMD architecture.

The base processing precision could comprise a first floating point accuracy and the selectable enhanced processing precision would comprise a second floating point accuracy greater than the first floating point accuracy.

The virtual cache registers include data from at least two complete sets of the base general registers. The base general registers comprise floating point data registers and the virtual cache registers include data from at least two of the floating point data registers.

The method of processing data comprises supplying instructions for processing data to a processing unit, processing the data in base general registers according to a base processing precision, and processing the data in virtual registers according to a selectable enhanced processing precision, wherein the base processing precision is determined by a base width of the base general registers and the selectable enhanced processing precision is determined by a virtual width of the virtual registers. The data is transferred to the expanded registers only through the base general registers The processing of the data in virtual registers comprises supplying first data to the base general registers, moving the first data from the base general registers to a first half of a virtual register of the virtual registers, supplying second data to the base general registers, and moving the second data from the base general registers to a second half of the virtual register.

The base general registers comprise floating point registers, the processing the data in virtual registers comprising supplying data to the floating point registers, and moving the data from the floating point registers to a virtual register of the virtual registers.

An alternative method to move floating point data into virtual registers comprises supplying first floating point data to memory, moving the first floating point data to the base general registers, moving the first floating point data from the base general registers to a first half of a virtual register of the virtual registers, supplying second floating point data to memory, supplying the second floating point data to the base general registers, and moving the second floating point data from the base general registers to a second half of the virtual register.

The invention has the ability to process a wider range of integer numbers, floating point numbers and logical data patterns, provides greater accuracy on floating point arithmetic and allows greater parallelism that has potential for higher performance. Furthermore, the invention makes processors compatible with applications software written for base architecture and also software which utilizes data formats in other architectures. The present invention uses examples with SIMD architectures but it is scalable to cover emerging architectures.

BRIEF DESCRIPTION OF THE DRAWINGS

The foregoing and other objects, aspects and advantages will be better understood from the following detailed description of preferred embodiments of the invention with reference to the drawings, in which:

FIG. 3 is an example for X86 architecture showing how the invention can process data in formats which have higher resolution and/or provide greater SIMD parallelism than the base X86 architecture;

FIG. 4 is a table illustrating the instructions which work with the formats shown in FIG. 3;

DETAILED DESCRIPTION OF PREFERRED EMBODIMENTS OF THE INVENTION

Figure 1:
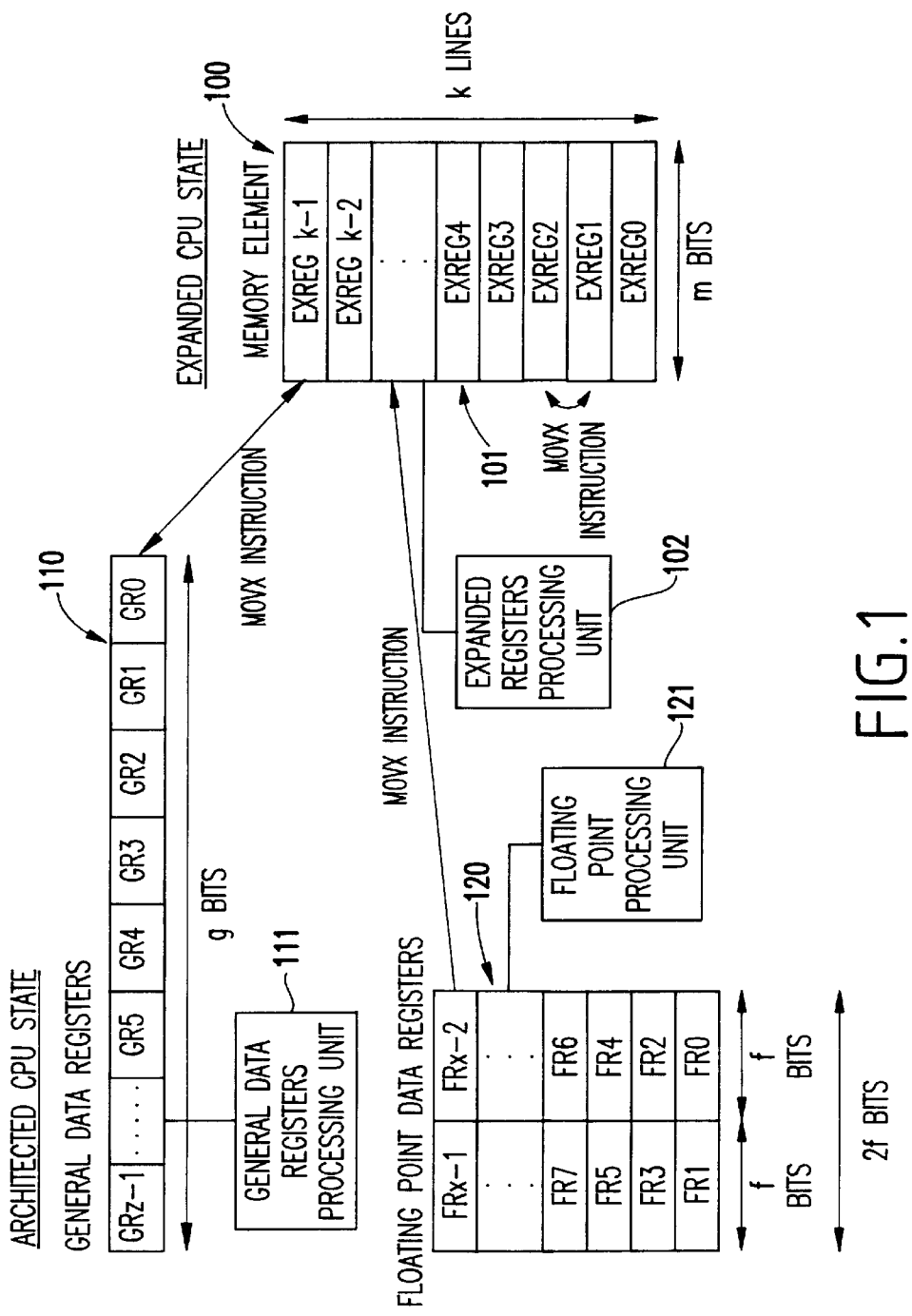
FIG. 1 is a schematic diagram of a memory element which expands a processor's architected general data registers and/or floating point data registers.

Referring now to the drawings, and more particularly to FIG. 1, a memory element 100 that provides an expanded (e.g., virtual) set of data registers for a processor is illustrated. Also shown is an expanded registers processing unit 102 for operating the memory element 100, a general data registers processing unit 111 for operating a general data register 110 and a floating point processing unit 121 for operating a floating point data register 120.

This memory element 100 is preferably implemented in a section of cache or a unique on-chip buffer. If the memory element 100 is within the on-chip cache, the on-chip cache is generally divided into a regular cache portion (which is used to store data and instructions being executed by the central processing unit) and into the memory element 100 using tags or other similar techniques.

The memory element 100 comprises lines 101 with each line being a new expanded data register (e.g., EXREGo to EXREGK- 1), as shown in FIG. 1. Each new register is wide enough to hold all architected integer data registers or two or more architected floating point data registers.

Once the memory element 100 is loaded, new instructions process data in the expanded registers 101 according to higher precision formats. Thus, the invention has a selectable enhanced processing precision where the precision is a function of the width (e.g., number of bits) in the source operand and the source operand(s) are in the memory element 100. Also, since the expanded registers 101 contain multiple architected registers 110, the processor is capable of performing Single Instruction Multiple-Data (SIMD) operations.

The expanded registers 101 are selectable. Therefore, the size and number of the registers is selectably controlled by the process which forms the memory element 100 (e.g., either during hardware design or through the logical apportion of on-chip cache using the tags).

Thus, the invention moves data to and from expanded registers so that new instructions can process data in the expanded registers. The expanded registers are wider than registers in the base architecture. Because they are wider, they have more bits to represent data values and they can represent quantities with higher precision and greater SIMD parallelism. Thus, the invention has the ability to process a wider range of integer numbers, floating point numbers and logical data patterns, provide greater accuracy on floating point arithmetic and allow greater SIMD parallelism that has the potential for higher performance.

The architected registers 110 are a pathway by which data is loaded into and out of the expanded registers. The architected registers 110 contain bytes of data and these values are written into an expanded register when a move instruction, referred herein to sometimes as "MOVX" and discussed in more detail below, is executed. The expanded registers 101 are wider (more bits per register) than the architected registers. Once the expanded registers 101 are loaded, the data in these registers is processed using new integer, floating point and logical instructions that operate with precision and SIMD parallelism that is higher than the base architecture. The opcode of each new instruction specifies the type of instruction (e.g., integer, floating point or logical) and operation (e.g., add, subtract, multiple, divide, shift, compare, etc.) to perform and the format of data in the expanded registers 101.

Thus, the invention allows data to flow into and out of the memory element 100 through architected CPU registers 110. This maintains compatibility with the architecture.

A base processing precision of the processing system is determined by the base width of the base registers 110 and a selectable enhanced processing precision is determined by the virtual width of the virtual cache registers 101. Further, the virtual cache registers 101 are accessible by the processing unit only through the base registers 101 for execution of enhanced instructions which provides the enhanced processing precision.

Figure 2:
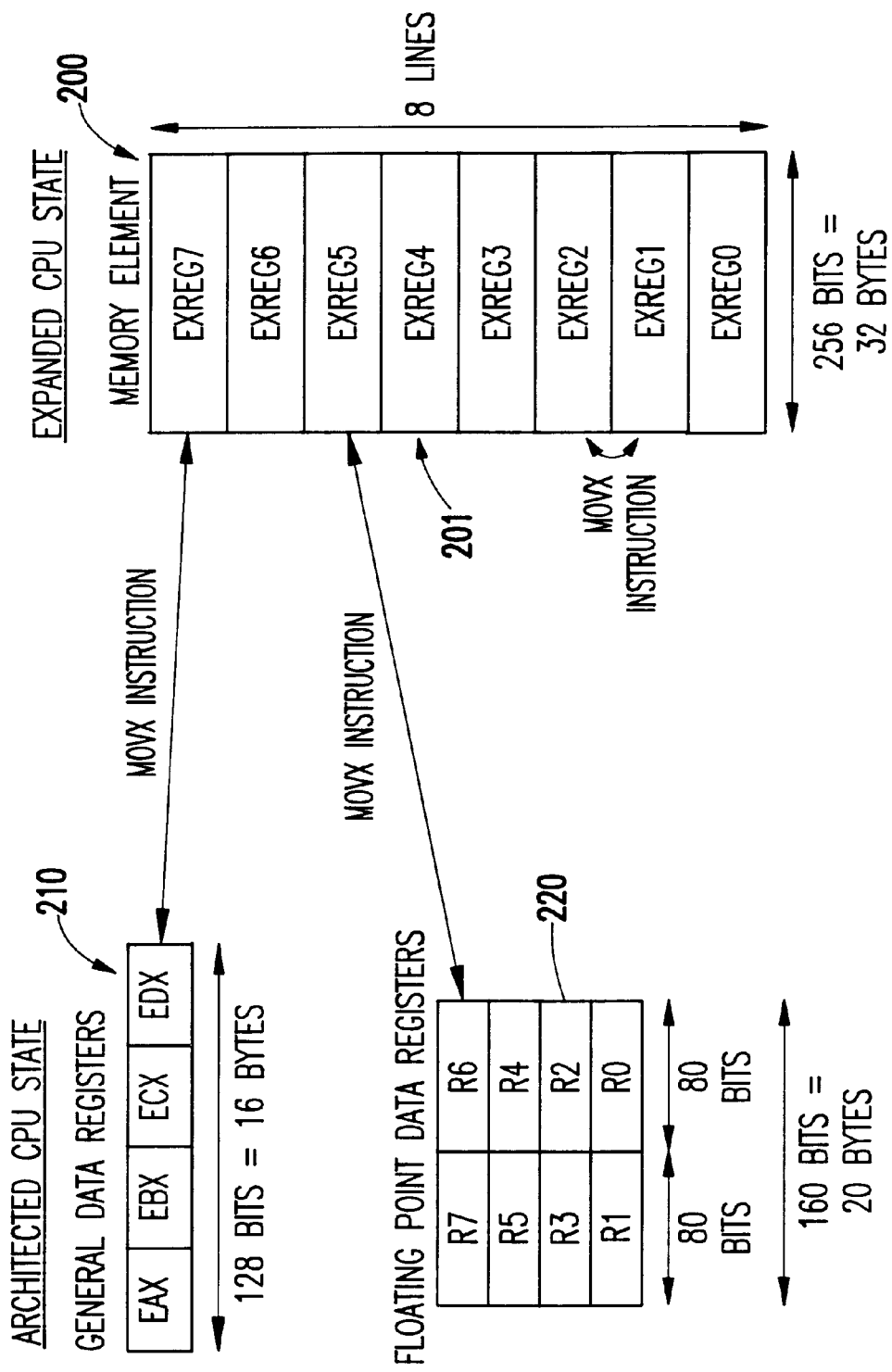
FIG. 2 is a schematic diagram of the structure shown in FIG. 1 implemented for an X86 architecture.

FIG. 2 shows an example of the invention in an X86 architecture. More specifically, FIG. 2 shows the structure of the memory element 200 which is similar to the memory element 100 discussed above with respect to FIG. 1. Similar features are similarly identified and a redundant discussion of the same is omitted.

In the example shown in FIG. 2, memory element 200 includes 8 lines 201 which are 32 bytes (256 bits) wide. The general data registers 210 include registers EAX, EBX ECX and EDX. The general data registers 210 are 16 bytes (128 bits) wide. The floating point data registers 220 include registers R0–R7 each of which is 80 bits wide or a total of 20 bytes wide (160 bits).

Therefore, as can be seen in FIG. 2, data registers 201 in the memory element 200 are twice as wide as the total width of the general data registers 210 of the architected CPU and wider than two floating point data registers 220. In this example, there are eight expanded registers 201 (EXREG0, EXREG1, . . . , EXREG7) and each one is 32 bytes wide. The X86 architecture has four architected general registers 201 (EAX, EBX, ECX, EDX) and each one is four bytes wide. To load an expanded register from the general registers requires two MOVX instructions.

Figure 5:
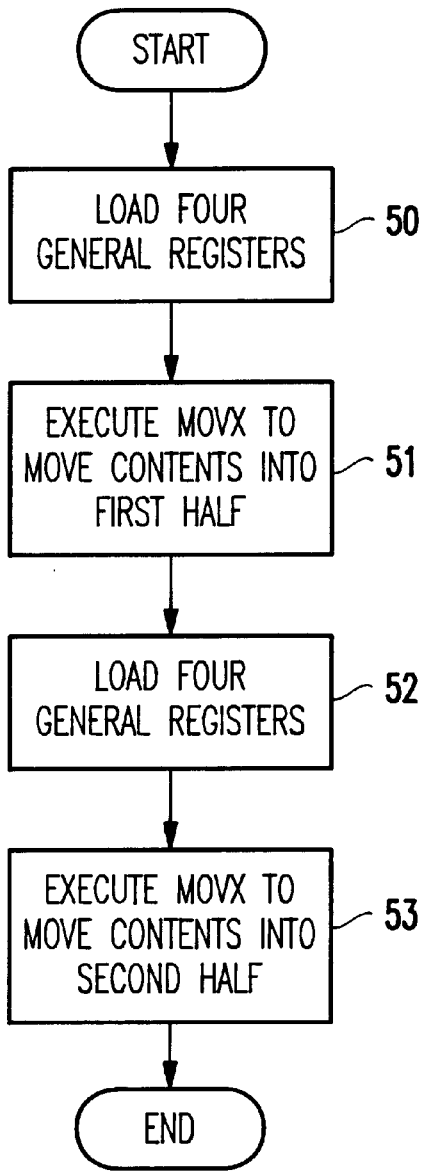
FIG. 5 is a flowchart illustrating an embodiment of the invention.

More specifically, as shown in FIG. 5, the load sequence includes the following processes. Load four general registers 210 from memory using standard X86 instructions 50. Execute MOVX to move contents of four general registers 210 into the first half of expanded registers 51. Load four general registers 210 from memory using standard X86 instructions 52. Execute MOVX to move contents of four general registers 210 into the second half of the expanded register 53. Therefore, as shown in FIG. 5, the MOVX instruction comprises a directive to move the data from the architected general data registers 210 to the expanded registers 201 (and back, when the data is to be restored to the general data registers 210). A key feature of the invention is that the MOVX instructions operates on data in the memory element 100, thereby providing higher precision functions without otherwise affecting the base architecture.

As would be known by one ordinarily skilled in the art, the process illustrated in FIG. 5 is reversed to restore the information to the general data registers 210. More specifically, the MOVX instruction would be repeated twice to restore a first 16-byte section of data to the general data registers 210 and subsequently to restore a second 16-byte section of data to the general data registers 210.

Figure 6:
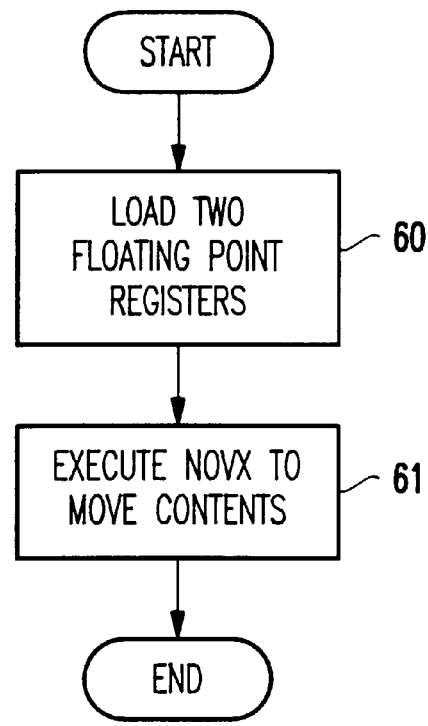
FIG. 6 is a flowchart illustrating an embodiment of the invention.

As shown in FIG. 2 the X86 architecture has eight architected floating point registers 220 (FR0, FR1, . . . , FR7) and each one is 10-bytes wide. The process shown in FIG. 6 is used to load two architected floating point registers 220 into an expanded register 201. More specifically the process shown in FIG. 6 includes loading two floating point registers 220 from memory using standard X86 instructions 60 and executing a MOVX instruction to move contents of two floating point registers 220 into the first 20 bytes of an expanded register 61. The process of FIG. 6 is reversed to restore data to architected floating point registers 220.

However, the process illustrated in FIG. 6 does not completely fill the 32-byte expanded registers because the two 10-byte floating point data registers leave 12-bytes of the 32-bytes unused. Therefore, a second embodiment of the invention completely fills each of the expanded registers 201 with floating point data. In this embodiment of the invention, floating point data enters the expanded register 201 through the general registers 210. To accomplish this, floating point data is first loaded to memory, then to the general data registers 210, and finally to the expanded registers 201 in 16-byte portions. Thus, the invention can fill the entire 32-byte width of an expanded register with floating point data.

FIG. 3 illustrates an example of how the contents of a 32-byte expanded register may be interpreted. The expanded register in this example supports three SIMD integer formats (2×16 bytes, 4×8 bytes and 8×4 bytes) and four SIMD floating point formats (2×16 bytes, 2×10 bytes, 4×8 bytes and 8×4 bytes). These SIMD formats are not supported in X86 architecture. Thus, with the invention an X86-based processor can be upgraded to support these SIMD formats.

While the invention has been describe above with reference to X86 and single instruction multiple data architectures, as would be known by one ordinarily skilled in the art given this disclosure, the invention is applicable to any processor architecture. Therefore, the invention would be equally applicable to improving the performance of an X86 architecture and as it would be to improving the performance of any future emerging architecture.

Note that several of the formats shown in FIG. 3 comply with the IEEE-754 standard as well as implementations on other processors. More specifically, FIG. 3 illustrates support for a 32-byte wide integer. Similarly 16-byte integers would be utilized in two-way parallelism and 8-byte integers would be utilized in four way parallelism. Also 4-byte integers would be utilized in eight-way parallelism.

FIG. 3 also illustrates that 32-byte floating point data would be utilized in one-way parallelism. Alternatively 10-byte and 16 byte floating point data would bZe utilized in two-way parallelism. As with the integers, 8-byte floating point data would be utilized in four-way parallelism and 4-byte floating point data would be utilized in eight-way parallelism. Since these expanded registers support higher precision formats and greater SIMD parallelism than the base architecture, the invention can be used to upgrade existing processors to support data formats used in higher performance architectures.

FIG. 4 shows the new instructions that work with these formats. In this way, the computational power of the X86 processor is expanded to the level of other processors. These new instructions perform the same type of operations (add, subtract, multiply, divide, shift, compare, etc) as instructions in the base architecture. The benefit is that these new instructions operate on larger amounts of data and/or do more operations in parallel (SIMD) than instructions in the base architecture. The benefits are higher performance and greater floating point precision. An example of instructions that can be executed by the invention to achieve enhanced precision are adding 32-byte Register 1 to 32-byte Register 0 using the following exemplary pseudo-code.

```
ADDX EXREG0, EXREG1
  ;32-byte add
  EXREG0←EXREG0+EXREG1
```

In summary, the invention has the ability to process a wider range of integer numbers, floating point numbers and logical data patterns, provide greater accuracy on floating point arithmetic, and allow greater SIMD parallelism that has the potential for higher performance. Furthermore, the invention makes processors compatible with applications software written for the base architecture and also software which utilizes data formats in other architectures.

While the invention has been described in terms of preferred embodiments, those skilled in the art will recognize that the invention can be practiced with modification within the spirit and scope of the appended claims.

What is claimed is:

1. A processing system comprising:
 a processing unit having a base cache;
 base registers having a base width and being operatively connected to said processing unit; and
 virtual cache registers having a virtual width and being located in said base cache, wherein said virtual width of said virtual cache registers is selectively expandable to any size as needed for accomodating different precision data formats,
 wherein a base processing precision of said processing system is determined by said base width of said base registers and a selectable enhanced processing precision is determined by said virtual width of said virtual cache registers,
 wherein said base registers store base instructions and data and said virtual cache registers store enhanced data, said virtual width being greater than said base width,and
 wherein said base cache includes tags identifying a portion of the base cache as said virtual cache registers, said virtual cache registers being accessible by said processing unit only for execution of enhanced instructions for providing said enhanced processing precision.

2. The processing system in claim 1, wherein said base registers have a first architecture and said virtual cache registers have a format associated with a second architecture.

3. The processing system in claim 1, wherein said base registers have a register width as that of an X86 architecture and said virtual cache registers have a packed data format of multiple words where a plurality of said words operate on said data simultaneously.

4. The processing system in claim 1, wherein said base processing precision comprises a first floating point accuracy and said selectable enhanced processing precision comprises a second floating point accuracy greater than said first floating point accuracy.

5. The processing system in claim 1, wherein said virtual cache registers include data from at least two complete base registers.

6. The processing system in claim 1, wherein said base registers comprise floating point data registers and said virtual cache registers include data from at least two sets of said floating point data registers.

7. A processing system comprising:
 a processing unit;
 base registers having a base width and being operatively connected to said processing unit; and
 virtual registers having a virtual width and being operatively connected to said processing unit, wherein said virtual width of said virtual registers is selectively expandable to any size as needed for accomodating different precision data formats,
 wherein a base processing precision of said processing system is determined by said base width of said base registers and a selectable enhanced processing precision is determined by said virtual width of said virtual registers.

8. The processing system in claim 7, wherein said base registers have a first architecture and said virtual registers have a format associated with a second architecture.

9. The processing system in claim 7, wherein said base registers have a register width as that of an X86 architecture and said virtual registers have a packed data format of multiple words where a plurality of said words operate on said data simultaneously.

10. The processing system in claim 7, wherein said base processing precision comprises a first floating point accuracy and said selectable enhanced processing precision comprises a second floating point accuracy greater than said first floating point accuracy.

11. The processing system in claim 7, wherein said processing unit includes a base cache and said virtual registers are located in said base cache, said base cache including tags identifying a portion of the base cache as said virtual registers.

12. The processing system in claim 7, wherein said virtual registers are located in a unique on-chip buffer.

13. The processing system in claim 7, wherein said base registers store base instructions and data and said virtual registers store enhanced data.

14. The processing system in claim 7, wherein said virtual width is greater than said base width.

15. The processing system in claim 7, said virtual registers are accessible by said processing unit for execution of enhanced instructions for providing said enhanced processing precision.

16. The processing system in claim 7, wherein said virtual registers include data from at least two complete base registers.

17. The processing system in claim 7, wherein said base registers comprise floating point data registers and said virtual registers include data from at least two sets of said floating point data registers.

18. A method of processing data comprising:
   supplying instructions for processing data to a processing unit;
   processing said data in base registers according to a base processing precision; and
   processing said data in virtual registers according to a selectable enhanced processing precision, wherein said virtual registers have a virtual width that is selectively expandable to any size as needed for accomodating different precision data formats,
   wherein said base processing precision is determined by a base width of said base registers and said selectable enhanced processing precision is determined by a virtual width of said virtual registers.

19. The method in claim 18, wherein said data is transferred to said virtual registers only through said base registers.

20. The method in claim 18, wherein said processing said data in virtual registers comprises:
   supplying first data to said base registers;
   moving said first data from said base registers to a first half of a virtual register of said virtual registers;
   supplying second data to said base registers; and
   moving said second data from said base registers to a second half of said virtual register.

21. The method in claim 18, wherein said base registers comprise floating point registers, said processing said data in virtual registers comprises:
   supplying data to said floating point registers; and
   moving said data from said floating point registers to a virtual register of said virtual registers.

22. The method in claim 18, wherein said processing said data in virtual registers comprises:
   supplying first floating point data to memory;
   moving said first floating point data to said base registers;
   moving said first floating point data from said base registers to a first half of a virtual register of said virtual registers;
   supplying second floating point data to memory;
   supplying said second floating point data to said base registers; and
   moving said second floating point data from said base registers to a second half of said virtual register.

23. The method in claim 18, wherein said base processing precision comprises a first floating point accuracy and said selectable enhanced processing precision comprises a second floating point accuracy greater than said first floating point accuracy.

* * * * *